J. L. CREVELING.
ELECTRIC REGULATION.
APPLICATION FILED MAR. 8, 1916. RENEWED APR. 2, 1921.
1,435,701.
Patented Nov. 14, 1922.
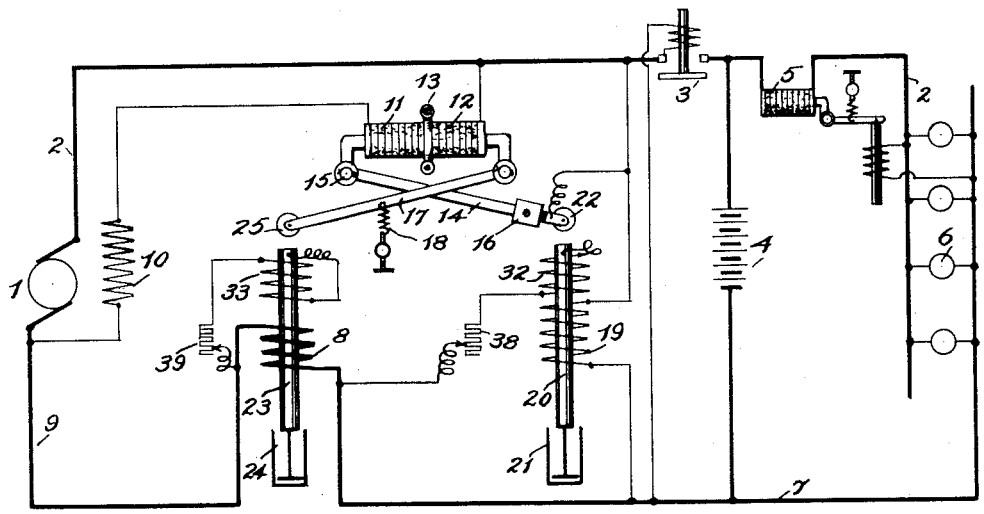
Fig. I.
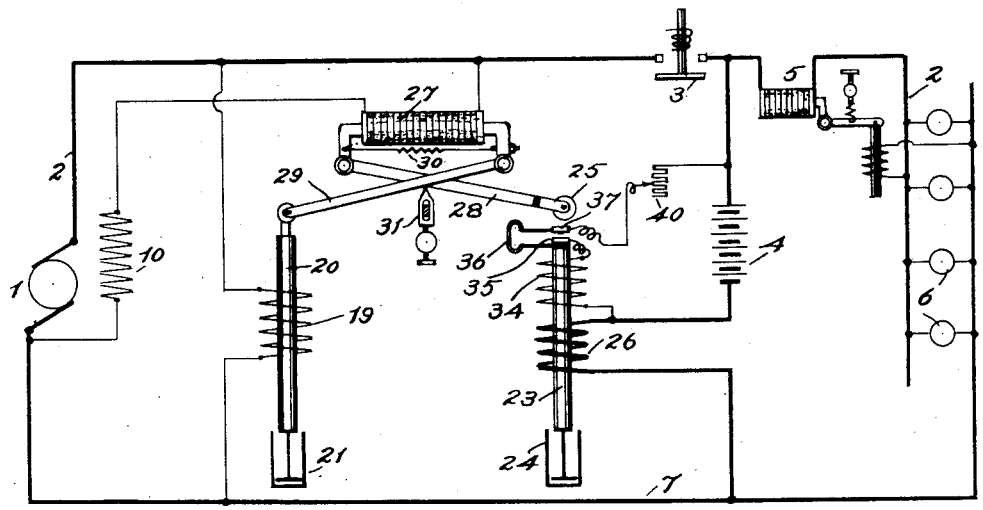
Fig. II.
INVENTOR:
John L. Creveling Patented Nov. 14, 1922.

1,435,701

UNITED STATES PATENT OFFICE.

JOHN L. CREVELING, OF TUCSON, ARIZONA, ASSIGNOR TO GOULD COUPLER COMPANY, A CORPORATION OF NEW YORK.

ELECTRIC REGULATION.

Application filed March 8, 1916, Serial No. 82,825. Renewed April 2, 1921. Serial No. 458,085.

*To all whom it may concern:*

Be it known that I, JOHN L. CREVELING, a citizen of the United States, and a resident of Tucson, Arizona, have invented certain new and useful Improvements in Electric Regulations, of which the following is a description.

My invention pertains to that class of electric regulation wherein it is desired to regulate an electric function in a predetermined manner, and has for a particular object to provide means whereby said regulation will be automatically accomplished.

My invention is particularly applicable to systems wherein a generator driven at variable speed is used to charge a storage battery and operate lamps and other translating devices which devices are maintained by the storage battery when the generator is running at sufficiently low speed or at rest; and as such systems are now widely used in the art of lighting railway cars by means of a generator driven from the car axle, my invention will be described with particular reference to such a system.

In the drawing,

Fig. 1 is a diagrammatic representation of one type of electrical system embodying my invention;

Fig. 2 is a diagrammatic representation of a system also embodying my invention.

In Fig. 1, 1 represents a dynamo or generator, from the positive terminal of which the lead 2 is carried to one side of any suitable type of switch mechanism, indicated as an automatic switch 3, the opposite terminal of which is electrically connected to the positive side of the storage battery 4 and any suitable regulating means, if desired, the presence of which is in this instance indicated by a diagrammatic representation of a carbon pile voltage regulator at 5, from which the lead 2 continues to the positive side of the translating devices 6, having their negative terminals connected with the lead 7, which is in communication with the negative side of the storage battery 4 and one end of the solenoid or winding 8, the opposite end of which is connected as by lead 9 with the negative side of the generator. The generator is provided with suitable exciting means, in this instance indicated as a shunt coil 10, having in series therewith the carbon piles 11 and 12 mechanically separated and electrically connected by a stationary or fixed member or disk 13. 14 is a bell crank lever pivoted at 15 and carrying upon its longer arm an adjustable weight 16, the position of which may determine the pressure exerted upon the pile 11. 17 is a bell crank lever, shown as provided with an adjustable spring 18, the tension of which may be adjusted to vary the pressure upon the pile 12. It will be obvious that both the levers 14 and 17 may be provided with spring adjustments, or both may be provided with weight adjustments, or, if desirable, both types of adjustment may be employed on each lever; the respective levers being shown in this instance as each provided with a different type of adjustment for the purpose of illustrating both types without extra drawing. 19 is a voltage responsive coil in shunt across the generator and tending when energized to lift the movable core indicated at 20, while too sudden movement of said core is prevented by the dash-pot indicated at 21. The coil 8 surrounds the core 23, and when excited tends to raise the same, while too sudden movement is prevented by the dash-pot indicated at 24. The cores 20 and 23 are mechanically independent of each other and are capable of certain vertical movement without affecting the regulating function of my invention. The core 20, when sufficiently raised, will come into contact with the sheave or roller 22, carried by the extremity of the lever 14, and then further elevation of the core 20 will raise the said lever in such manner as to relieve the pressure upon the carbon pile 11, and in that way affect the operation of the generator in a well known manner. 32 is a fine coil which when excited tends to assist the coil 19, for a purpose which will hereinafter appear, and is in this instance indicated as having one of its terminals connected with the lead 7, and the other with the core 20, while the sheave 22 is shown electrically insulated from the lever 14 and electrically connected with the lead 2, in such manner that when the core 20 comes into contact with the sheave 22 the coil 32 is supplied with current through said contact. If the core 23 be raised, it may cause contact with the sheave 25 carried at the extremity of the lever 17, and then further movement will alter the resistance of the pile 12 and affect the generator in a well known manner. 33 is a solenoid surrounding the core 23 and tending when energized to assist the coil 8, and in this instance 33 is shown as a coil of fine winding having one terminal connected with the lead 7 and the other with the core 23, while the sheave 25 is shown as electrically connected with the carbon pile 12 and the lead 2, so that when core 23 comes into contact with sheave 25, coil 33 is in shunt across the generator mains, for a purpose which will be explained.

In Fig. 2 like numerals have been used to indicate like parts, and the system shown in the said figure is the same as that shown in Fig. 1, except for the following: The current responsive coil is indicated at 26 in series with the storage battery only, instead of in series with the main circuit, as shown at 8 in Fig. 1. The current responsive coil is shown as the right-hand coil instead of the left-hand coil, as shown in Fig. 1, to indicate that the relative positions of said coils may be readily changed without departing from my invention. The voltage responsive coil is shown as the left-hand coil, and its core or plunger 20 is shown as mechanically connected with the extremity of the lever 29, instead of mechanically separated from its cooperating lever, as shown in Fig. 1, to indicate that one of the plungers may be mechanically connected or linked with its cooperating lever without departing from my invention, as will hereinafter more plainly appear.

A single carbon pile 27 is shown as replacing the two carbon piles 11 and 12, separated mechanically by the conducting member 13, and the compression upon the pile 27 is controlled through the instrumentality of the adjustable spring 30, or equivalent means. 31 is an adjustable stop capable of engaging either of the levers 28 and 29, and when one of the levers is raised the other lever rests upon the said stop 31. 34 is a winding which, when energized, tends to assist the coil 26, and, in this instance, is shown as a fine winding having a terminal connected with one side of the storage battery 4, and the other terminal connected with an insulated contact piece 35 upon the core 23, above which is carried, by the insulated spring 36, a contact member 37 flexibly connected with the opposite side of the storage battery 4. The lever 28 is shown as insulated from the carbon pile, and when core 23 is raised contacts 35 and 37 are pressed together before any appreciable pressure is exerted upon sheave 25, and thus a circuit through coil 34 is established, for a purpose as will hereinafter be explained.

An operation of my invention is substantially as follows, referring particularly to Fig. 1:

If the generator 1 be at rest or operating at low speed, the switch 3 will be open and the translating devices 6 may be supplied by the storage battery 4, and the voltage upon the said translating devices regulated in a well known manner, through the instrumentality of the voltage regulator indicated at 5. With the generator running, current will flow through the field energizing winding 10, carbon piles 11 and 12, and the magnetic field will build up in a well known manner; and when the generator voltage is substantially equal to that of the battery 4, switch 3 will close and then further rise in generator speed will tend to cause the generator to supply current to the storage battery 4 and translating devices 6. And, it will be obvious that either the current supplied by the generator or the voltage impressed upon any particular point of its circuit may be regulated by manipulation of the carbon piles 11 and 12. With the generator running, current will flow through the voltage responsive coil 19 and tend to lift the core 20 against the action of gravity, which may be used as the sole adjustment, or any other type of adjustment, as for example, springs, not shown, may be employed, if desired. I so adjust the relationship of the coil 19 and the core 20 that at a predetermined voltage the core 20 will be raised evenly, owing to the action of dash-pot 21, and come in contact with the roller 22, and then further movement of the core 20 will raise the lever 14 and relieve the pressure upon the carbon pile 11 and cause the generator voltage to be prevented from exceeding a predetermined limit, which may be very carefully adjusted by properly adjusting the weight 16, or equivalent means. When the core 20 comes into contact with the sheave 22, a circuit is established through the coil 32 and current will flow from the lead 2 to the lead 7, through the said coil, and I preferably adjust this coil, as by proportioning its windings or by manipulating the adjustable resistance 38 in series therewith, that when this contact 22—20 is made and the coil 32 excited this coil will materially assist the coil 19 so that a very delicate increase in voltage across the coil 19 will now be able to lift the weight 16 and lever 14, and the cooperation of coils 32 and 19 will thus hold the voltage of the generator from exceeding a predetermined amount within a very narrow margin. Or, in some cases, I may even cause a slightly less voltage to be held upon the generator after the contact 22—20 is established than was necessary across the coil 19 to raise the core 20 and close the said contact, in case this be desirable. I usually prefer to adjust this predetermined limit of voltage so that if the storage battery be in a fully charged state the predetermined voltage which cannot be exceeded by the generator is substantially equal to that of the battery. Therefore, with this adjustment, when the battery becomes charged its charging current will fall off in a well known manner and the battery will practically float across the line, while the current to the translating devices may be supplied by the generator. The current supplied by the generator all passes through coil 8 and tends to lift the core 23 against the action of gravity, or other suitable adjusting means, and cause the core 23 to be lifted smoothly, owing to dash-pot 24, into contact with roller 25. And I prefer to so adjust the relationship of the coil 8 and the core 23 that considerable, and sometimes almost the maximum, current may be supplied by the generator before any action of core 23 takes place at all. But when the current output of the generator approaches its maximum desired value, then plunger 23 moves into contact with the roller 25; and I so adjust the spring 18, or equivalent means, that when the maximum desired current is reached in the coil 8 this maximum will be held from being appreciably exceeded by the upward movement of core 23 swinging lever 17 so as to decrease the pressure upon the pile 12 in a manner well understood by those skilled in the art. When the coil 8 brings the core 23 into contact with the sheave 25, current flows from the lead 2 through lever 17, contact 25—23, and winding 33, and adjustable resistance 39 to the lead 7, and I so adjust the effect of the coil 33, as by manipulation of the resistance 39, or other suitable means, that the said coil, cooperating with the coil 8, will assist the same materially, and a very small increase in current above that necessary to cause the contact 25—23 to be established will now be able to increase the resistance 12 and prevent this current being exceeded. Or, in some cases, when desired, I may cause the assistance of the said coil 33 to be sufficient that the current value, excess of which is prevented through the action of coil 8 and coil 33, will even be less than the current necessary in the coil 8 to lift the core 23 and establish the said contact, and very delicately maintain it at this value.

From the foregoing it will be noted that a certain voltage may be reached across the generator, and a certain current may be supplied by the generator without moving the respective voltage responsive or current responsive cores, which then have no effect upon the system, and that an excess above predetermined limits of voltage will be prevented by the core 20 lifting lever 14 and affecting the pile 11 independently of any operation whatever tending to affect the pile 12, which will be affected only in case the generator current tend to exceed a predetermined limit, whereupon the core 23 will raise the lever 17 and affect the carbon pile 12, which it may do independently of any action whatever taking place upon the pile 11. And it will be noted that after a predetermined current or voltage maximum, either or both, be reached, the regulating means may from that time on automatically establish and maintain a lower maximum limit of voltage or current, or both, if this be desired. If the generator voltage at any time tend to fall below that of the storage battery, the switch 3 will open and prevent back discharge, in a well known manner.

The operation of the system shown in Fig. 2 is substantially the same as that shown in Fig. 1, with the exception that the voltage responsive coil 19 has its core 20 shown as attached to the lever arm 29, and therefore any attraction exerted upon or motion given to the core 20 tends to affect the carbon pile 27 so as to affect the generator. The current limiting coil 29 is shown as limiting only the storage battery current, while in Fig. 1 it is the total output of the generator which is thus limited, a difference of connection well understood by those skilled in the art. The coil 26 is assisted by the coil 34 when the same is excited, and, in this figure, the assisting coil is shown as in shunt to the storage battery, instead of in shunt to the generator circuit as shown in Fig. 1, a difference of connection which may be used with the devices of either figure without departing from the scope of my invention, which is in no way limited to the source supplying the assisting coils indicated at 23, 32 and 34.

In Fig. 2 it will be noted that circuit through coil 34 is established by the pressing together of two contacting members carried by the core, and it will be obvious any suitable contacting device may be employed. This type is shown in one form only for sake of simplicity, to indicate that the contacting means may be spring-supported and electrically independent of the mechanical members pressing the contacts together, if desired.

It will be noted that in the operation of the system shown in Fig. 2, the voltage and current limits are both held from being exceeded by affecting a single carbon pile 27, instead of the separate piles shown in Fig. 1, and that whenever either the voltage responsive coil or the current responsive coil is lifting its respective lever 28 or 29, so as to tend to regulate the operation of the generator, the other lever will rest upon the stop 31, while the one coil and its cooperating lever will perform the total regulation of the generator. It is within the scope of my invention to unite either the core 23 of the current coil, or the core 20 of the voltage coil, with its respective arm, lever, or other device, affecting the operation of the generator. But, I leave at least one of the said cores free, which is preferably the current responsive core, which remains in the position shown in the drawing, as normally inoperative, ineffective, and out of commission, except at just such times as the voltage of the generator, below or at the maximum value which cannot be exceeded, tends to cause an excess current either to the battery or to line. And, therefore, I usually use the current limiting device merely as a protective device in what might be termed a constant potential system, to prevent the desired potential from causing a current value in the battery circuit, which might injure the same, or in the generator circuit, which might injure the generator.

Therefore, my invention is particularly useful in car lighting systems employing a generator driven from the car axle and subject to wide speed changes.

I do not wish in any way to limit myself to the exact constructions indicated in this specification, nor to the exact modes of operation above outlined, which are given to illustrate embodiments of my invention, for it will be obvious that wide departure in details of construction and operation may be made without departing from the spirit and scope of my invention, which is as set forth in the following claims:

1. Regulating means comprehending a regulating element, voltage responsive means and means whereby the same effects said element, current responsive means and means whereby the same effects said element, and means affected by and cooperating with one of said responsive means independently of the other responsive means to affect said regulating element.

2. Regulating means comprehending a regulating element, voltage responsive means including means operating upon said element, current responsive means including means operating upon said element, and electric means controlled by and cooperating with one of said responsive means independently of the other responsive means to affect said regulating element.

3. Regulating means comprehending a regulating element, voltage responsive means operating upon said element, current responsive means independently operating upon said element, and electro-magnetic means affected by and cooperating with one of said responsive means independently of the operation of the other responsive means to affect said regulating element.

4. Regulating means comprehending means capable of performing a regulating function when acted upon, voltage and current responsive means capable of acting thereupon, and means affected by and cooperating with the responsive means whereby the responsive means when operated by one of said quantities may affect the standard value of that quantity necessary to affect the responsive means without affecting the operating standard of the other quantity.

5. Regulating means comprehending means capable of performing a regulating function when acted upon, voltage responsive and current responsive means capable of acting thereupon, and means cooperating with said responsive means whereby the responsive means when operated by one of said quantities may affect the standard value of that quantity necessary to affect the responsive means without affecting the operating standard of the other quantity.

6. Regulating means comprehending means capable of performing a regulating function when acted upon, voltage responsive means and current responsive means each capable of acting thereupon, and means cooperating with said responsive means whereby the responsive means when operated by one of said quantities may affect the standard value of that quantity necessary to affect the responsive means without affecting the operating standard of the other quantity.

7. Regulating means comprehending means capable of performing a regulating function when acted upon, voltage responsive means and current responsive means each capable of acting thereupon, and means affected by and cooperating with one of said responsive means to modify the operation thereof independently of the operation of the other.

8. Regulating means comprehending means capable of performing a regulating function when acted upon, voltage responsive means and current responsive means each capable of acting thereupon, and means affected by each of said responsive means to independently modify the operation thereof while the other responsive means is performing a regulating function.

9. The combination with a source of electrical potential difference and means for regulating the same, of means for affecting said regulating means responsive to a plurality of effects caused by said potential difference, and means cooperating with the responsive means whereby the responsive means when operated by one of the said effects alters the standard value of that effect necessary to operate the responsive means without affecting the standard of the operating value of another of said effects.

10. The combination with a source of electrical potential difference and means for regulating the same, of means for independently affecting said regulating means responsive to a plurality of effects caused by said potential difference, and means cooperating with the responsive means whereby the responsive means when operated by one of the said effects alters the standard value of that effect necessary to operate the responsive means without affecting the standard of the operating value of another of said effects.

11. Means for regulating an electric circuit comprehending circuit affecting means, a plurality of means for affecting said circuit affecting means, movable means capable of movement without affecting said circuit affecting means, current and voltage responsive means for moving said movable means into cooperative relation with the affecting means, and electrically affected means cooperating with the responsive means to regulate said circuit.

12. Means for regulating an electric circuit comprehending circuit affecting means, a plurality of means for affecting said circuit affecting means, movable means capable of movement without affecting said circuit affecting means, current responsive means and voltage responsive means for moving said movable means into cooperative relation with the affecting means, and electrically controlled means cooperating with the responsive and affecting means to regulate said circuit.

13. Means for regulating an electric circuit comprehending circuit affecting means, a plurality of means for affecting said circuit affecting means, movable means capable of movement without affecting the circuit affecting means, current responsive means and voltage responsive means for moving said movable means into cooperative relation with the affecting means, and electromagnetic means controlled by the responsive means and cooperating therewith to regulate said circuit.

14. The combination with a generator, of means for regulating the same comprehending regulating means, movable members capable of separately affecting said means when moved, means capable of movement without affecting said members, means responsive to the generator operation for moving said last named means and said members, and electrically affected means cooperating with the responsive means to affect said regulating means, and affected by said movement.

15. The combination with regulating means the effect of which may be varied by variations in pressure thereon, of means tending to exert pressure thereon, a plurality of magnetically movable members at least one of which is mechanically disconnected from said means and capable of movement without directly affecting the said pressure, voltage and current responsive means coacting with said magnetically movable members to move the same and to affect the pressure exerting means, and means controlled by said movement whereby the responsive means when operated by one of the said effects alters the standard value of that effect necessary to operate the responsive means without affecting the standard of the operating value of another of said effects.

16. The combination with a generator and a storage battery charged thereby, of means for automatically regulating the generator comprehending means the regulating effect of which varies with variations in pressure, means for exerting pressure thereon, a current coil in series with the generator and at least a portion of its work, a voltage coil affected by variations in voltage across the battery and generator circuit, separate movable cores coacting with said coils, at least one of said cores being mechanically disconnected from the pressure exerting means and capable of movement without affecting the same, and capable with certain movement of affecting the same, and means co-operating with said core during a portion of its movement to affect the pressure to control the regulating means independently of the operating position of the other core.

17. The combination with a generator and means for controlling the same, of a plurality of separately movable cores, and means coacting therewith whereby each may affect the controlling means regardless of the action of the other, a voltage responsive coil affecting one of said cores, a current responsive coil affecting another of said cores and electro-magnetic means affected by movement of one of said cores before said core is able to affect the said coacting means.

18. The combination with a generator and a storage battery charged thereby, of means for automatically regulating the generator comprehending means the regulating effect of which varies with variations in pressure, means for exerting pressure thereon, a current coil in series with the generator and at least a portion of its work, a voltage coil affected by variations in voltage across the battery and generator circuits, separate movable cores coacting with said coils, at least one of said cores being mechanically disconnected from the pressure exerting means and capable of movement without affecting the same, and capable with certain movement of affecting the same, and electromagnetic means co-operating with said core during a portion of its movement to affect the pressure upon the regulating means, and thereby cooperating with one of said coils in controlling the generator independently of the effect produced by the other.

19. Regulating means comprehending a regulating device, voltage responsive means and lever mechanism whereby the same affects said device, current responsive means and lever mechanism whereby the same affects said device, and means affected by and cooperating with one of said responsive means independently of the other responsive means to affect said regulating device.

20. Regulating means comprehending a regulating device of the compressible pile type, voltage responsive means including a member through which the same affects the pressure upon said device, current responsive means including a member through which the same affects the pressure upon said device, and means affected by and cooperating with one of said responsive means independently of the other responsive means to affect said device.

21. Regulating means comprehending a compressible pile, voltage responsive means including a member through which the same acts directly upon said pile, current responsive means including a member through which the same acts directly upon said pile, and means affected by and cooperating with one of the responsive means independently of the other responsive means to affect said pile.

22. Regulating means comprehending a compressible pile, a plurality of responsive means each including a member through which the same acts directly upon said pile, and means affected by and cooperating with one of the responsive means independently of the other responsive means to affect said pile.

JOHN L. CREVELING.